United States Patent
Lee

(10) Patent No.: US 11,267,317 B2
(45) Date of Patent: Mar. 8, 2022

(54) SYSTEM FOR CONTROLLING INSIDE/OUTSIDE AIR IN AIR CONDITIONER

(71) Applicants: Hyundai Motor Company, Seoul (KR); Kia Motors Corporation, Seoul (KR)

(72) Inventor: Yoon Hyung Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 286 days.

(21) Appl. No.: 16/680,245

(22) Filed: Nov. 11, 2019

(65) Prior Publication Data
US 2020/0189356 A1    Jun. 18, 2020

(30) Foreign Application Priority Data
Dec. 13, 2018   (KR) .................. 10-2018-0161156

(51) Int. Cl.
*B60H 1/00* (2006.01)
*B60H 1/06* (2006.01)
*B60H 1/26* (2006.01)
*B60J 10/60* (2016.01)

(52) U.S. Cl.
CPC ..... *B60H 1/00849* (2013.01); *B60H 1/00028* (2013.01); *B60H 1/00207* (2013.01); *B60H 1/00428* (2013.01); *B60H 1/00785* (2013.01); *B60H 1/06* (2013.01); *B60H 1/26* (2013.01);
(Continued)

(58) Field of Classification Search
CPC ............ B60H 1/00849; B60H 1/00028; B60H 1/00207; B60H 1/00428; B60H 1/00785; B60H 1/06; B60H 1/26; B60H 1/00021; B60H 1/00735; B60H 1/00821; B60H 1/00842; B60H 2001/00214; B60H 2001/00221; B60H 2001/00185;
(Continued)

(56) References Cited

U.S. PATENT DOCUMENTS 5,516,041 A * 5/1996 Davis, Jr. ........... B60H 1/00785
236/49.3
5,701,752 A * 12/1997 Tsunokawa ........ B60H 1/00785
165/204
(Continued)

*Primary Examiner* — Emmanuel E Duke
(74) *Attorney, Agent, or Firm* — Morgan, Lewis & Bockius LLP

(57) ABSTRACT

A system for controlling inside/outside air in air conditioner may include an air conditioner including an upward discharge passage, through which air is discharged toward a front glass of a vehicle, a downward discharge passage, through which air is discharged toward a floor of the vehicle, the upward discharge passage and the downward discharge passage being separated from each other, a first intake door, an opening amount of which is determined according to a ratio between inside air and outside air introduced into the upward discharge passage, and a second intake door, an opening amount of which is determined according to a ratio between inside air and outside air introduced into the downward discharge passage; and a control unit configured of controlling the opening amounts of the first and second intake doors according to a heating load of the air conditioner and a humidity of the interior of the vehicle.

20 Claims, 9 Drawing Sheets

(52) U.S. Cl.
CPC ..... *B60J 10/60* (2016.02); *B60H 2001/00214* (2013.01); *B60H 2001/00221* (2013.01)

(58) Field of Classification Search
CPC ........... B60H 2001/00085; B60H 2001/00135; B60H 2001/0015; B60J 10/60
See application file for complete search history.

(56) References Cited

U.S. PATENT DOCUMENTS

| | | | | |
|---|---|---|---|---|
| 6,971,584 | B2* | 12/2005 | Schmitt | B60S 1/026 236/44 R |
| 7,222,666 | B2* | 5/2007 | Homan | B60H 1/00842 165/202 |
| RE45,939 | E* | 3/2016 | Yelles | B60H 1/3208 |
| 2006/0289458 | A1* | 12/2006 | Kim | H05B 1/0236 219/497 |
| 2007/0130972 | A1* | 6/2007 | Jang | B60H 1/00785 62/186 |
| 2015/0017900 | A1* | 1/2015 | Baek | B60H 1/00742 454/75 |
| 2018/0117988 | A1* | 5/2018 | Sarnia | G01N 27/048 |
| 2018/0209929 | A1* | 7/2018 | Yamazaki | B60S 1/54 |

* cited by examiner

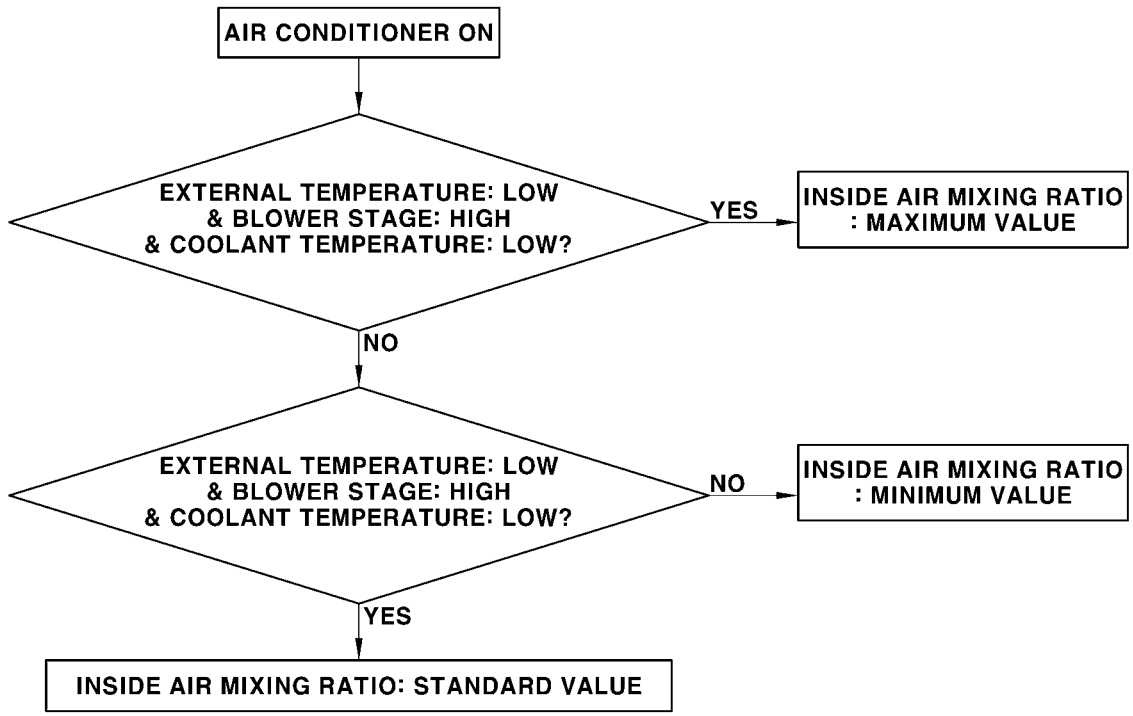

SYSTEM FOR CONTROLLING INSIDE/OUTSIDE AIR IN AIR CONDITIONER

CROSS-REFERENCE TO RELATED APPLICATION

The present application claims priority to Korean Patent Application No. 10-2018-0161156 filed on Dec. 13, 2018, the entire contents of which is incorporated herein for all purposes by this reference.

BACKGROUND OF THE INVENTION

Field of the Invention

The present invention relates to a system for controlling inside/outside air in an air conditioner. More particularly, it relates to a system for controlling inside/outside air in an air conditioner for maximizing a heating effect of a vehicle interior without fogging on a vehicle glass.

Description of Related Art

A vehicle is provided with an air conditioning system for controlling indoor temperature and ventilation (hereinafter, referred to as an "air conditioner"), and the air conditioner is also called a heating, ventilation, and air conditioning system (HVAC).

In general, the air conditioner heats or cools outdoor air (outside air) introduced from the outside of the vehicle or indoor air (inside air) circulated in the interior of the vehicle and supplies the heated and cooled air to the interior to heat or cool the interior of the vehicle.

Such an air conditioner utilizes engine coolant as a heat source for heating air. However, the engine heat quantity is reduced and the temperature of the engine coolant used as a main heat source for heating the vehicle interior is lowered as techniques for increasing engine efficiency have been applied in recent years. As a result, it is difficult to secure the heating effect of the vehicle interior using the engine coolant, which causes a problem relating to deterioration in the heating performance of the vehicle interior.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system for controlling inside/outside air in an air conditioner, configured for enhancing indoor heating performance by increasing a maximum amount of inside air circulated through an air conditioner without fogging on a windshield glass in front of a vehicle to reduce heat loss due to introduction of outside air for ventilation.

In an exemplary embodiment of the present invention, there is provided a system for controlling inside/outside air in an air conditioner, which includes an air conditioner including an upward discharge passage, through which air is discharged toward a front glass of a vehicle, a downward discharge passage, through which air is discharged toward a floor of the vehicle, the upward discharge passage and the downward discharge passage being separated from each other, a first intake door, an opening amount of which is determined according to a ratio between inside air and outside air introduced into the upward discharge passage, and a second intake door, an opening amount of which is determined according to a ratio between inside air and outside air introduced into the downward discharge passage, and a control unit configured of controlling the opening amounts of the first and second intake doors according to a heating load of the air conditioner and a humidity of the interior of the vehicle.

The upward discharge passage may be configured such that only outside air is introduced when the first intake door is fully open and only inside air is introduced when the first intake door is fully closed, and the downward discharge passage may be configured such that only inside air is introduced when the second intake door is fully open and only outside air is introduced when the second intake door is fully closed. Furthermore, outside air and inside air may be simultaneously introduced into the upward discharge passage when the first intake door is partially open, and outside air and inside air may be simultaneously introduced into the downward discharge passage when the second intake door is partially open in a state in which the first intake door is at least partially open.

When the heating load of the air conditioner is equal to or greater than a reference load and the humidity of the vehicle interior is less than or equal to a reference humidity, the control unit may allow the first and second intake doors to be fully open, and then periodically control the opening amounts of the first and second intake doors based on a fog risk level according to the humidity of the vehicle interior. The fog risk level may be divided into a plurality of levels based on the internal humidity value, and the control unit may reduce the opening amount of the first intake door and maintain the opening amount of the second intake door when it is determined that it is possible to reduce the opening amount of the first intake door based on the fog risk level. The control unit may determine that it is possible to reduce the opening amount of the first intake door when it is determined that the fog risk level is lower than a set reference level.

The control unit may reduce the opening amount of the second intake door and maintain the opening amount of the first intake door when it is determined that it is necessary to reduce the opening amount of the second intake door based on the fog risk level in a state in which the first intake door is fully open. The control unit may determine that it is necessary to reduce the opening amount of the second intake door when it is determined that the fog risk level is higher than a set reference level in a state in which the first intake door is fully open.

The control unit may maintain the opening amount of the first intake door when it is determined that it is unnecessary to change the opening amount of the first intake door based on the fog risk level, and maintain the opening amount of the second intake door when it is determined that it is unnecessary to change the opening amount of the second intake door based on the fog risk level.

The control unit may allow the first intake door to be open by a predetermined amount and allow the second intake door to be maintained in a fully open state when the fog risk level is a set minimum level, and may allow the first intake door to be maintained in a fully open state and allow the second intake door to be fully closed when the fog risk level is a set maximum level.

The control unit may allow the first intake door to be fully open and allow the second intake door to be fully closed when the heating load of the air conditioner is less than the reference load or the humidity of the vehicle interior exceeds the reference humidity.

The heating load of the air conditioner may be determined based on a vehicle external temperature, a blower rotation speed of the air conditioner, and an engine coolant temperature. The humidity of the vehicle interior may be a relative humidity value measured by a humidity sensor mounted on the front glass in front of the vehicle. The air conditioner may include a heating unit of heating air introduced into the upward discharge passage and the downward discharge passage, and the heating unit may heat the air according to the heating load.

In another exemplary embodiment of the present invention, there is provided a system for controlling inside/outside air in an air conditioner, which includes an air conditioner including an upward discharge passage, through which air is discharged toward a front glass of a vehicle, a downward discharge passage, through which air is discharged toward a floor of the vehicle, the upward discharge passage and the downward discharge passage being separated from each other, a first intake door, an opening amount of which is determined according to a ratio between inside air and outside air introduced into the upward discharge passage, and a second intake door, an opening amount of which is determined according to a ratio between inside air and outside air introduced into the downward discharge passage, and a control unit configured of controlling the opening amounts of the first and second intake doors according to a heating load of the air conditioner.

The upward discharge passage may be configured such that only outside air is introduced when the first intake door is fully open and only inside air is introduced when the first intake door is fully closed, and the downward discharge passage may be configured such that only inside air is introduced when the second intake door is fully open and only outside air is introduced when the second intake door is fully closed. Furthermore, outside air and inside air may be simultaneously introduced into the upward discharge passage when the first intake door is partially open, and outside air and inside air may be simultaneously introduced into the downward discharge passage when the second intake door is partially open in a state in which the first intake door is at least partially open.

The control unit may allow the first and second intake doors to be fully open when the heating load of the air conditioner is equal to or greater than a first load value and less than a second load value. The control unit may allow the first intake door to be open by a certain amount and allow the second intake door to be fully open when the heating load of the air conditioner is equal to or greater than a second load value which is higher than a first load value. The control unit may allow the first intake door to be fully open and allow the second intake door to be fully closed when the heating load of the air conditioner is less than a first load value.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the present invention are discussed infra.

BRIEF DESCRIPTION OF THE DRAWINGS

FIG. 9 is a block diagram illustrating a method of controlling inside/outside air in an air conditioner according to various exemplary embodiments of the present invention.

Figure 1:
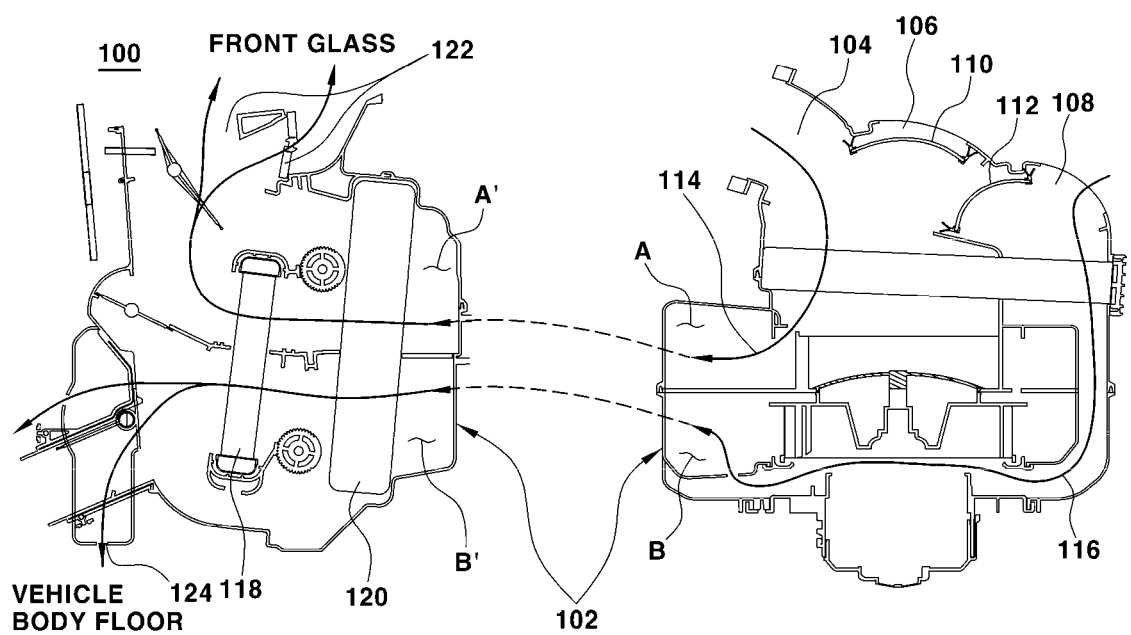
FIG. 1 is a cross-sectional view exemplarily illustrating an upward discharge passage and a downward discharge passage for an air flow in a case of an air conditioner according to an exemplary embodiment of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

When the temperature outside a vehicle is very low as in the winter season, it is advantageous for indoor heating to decrease an air amount introduced from the outside of the vehicle (i.e., an amount of outside air) and increase an air amount circulated in the interior of the vehicle (i.e., an amount of inside air). That is, it is advantageous for vehicle heating to mix the outside air introduced into the interior of the vehicle with a large amount of inside air. This is because the temperature of outside air is relatively low and the temperature of inside air is relatively high, reducing heat loss due to the outside air.

However, the amount of ventilation of indoor air is reduced as the ratio of inside air mixed with outside air increases, which is more likely to generate fog on a vehicle glass. If fog is generated on a windshield glass (hereinafter, referred to as a "front glass") in front of the vehicle for securing a driver's main view, driving safety is significantly lowered. Therefore, it is important to prevent fogging on the front glass while driving.

Accordingly, the present invention is to enhance indoor heating performance by increasing a maximum amount of inside air circulated in the vehicle interior through an air conditioner without fogging on the front glass to reduce heat loss due to introduction of outside air.

To the present end, the present invention prevents fogging on the front glass and simultaneously improves the heating performance of the vehicle interior by increasing the ratio of outside air having a relatively lower humidity than inside air in the air discharged toward the front glass through the air conditioner and increasing the ratio of inside air having a relatively higher temperature than outside air in the air discharged toward the vehicle body floor through the air conditioner.

FIG. 1 is a cross-sectional view exemplarily illustrating an upward discharge passage and a downward discharge passage for an air flow in a case of an air conditioner.

As illustrated in FIG. 1, a heating unit 118 for heating air and a cooling unit 120 for cooling air are mounted in a case 102 of an air conditioner 100 (hereinafter, referred to as an "air conditioning case"). The heating unit 118 heats air through heat exchange between engine coolant and the air.

Although not illustrated in detail, the air conditioning case 102 may have an air inlet (an outside air inlet and an inside air inlet) formed for air introduction on the right thereof in the width direction of a vehicle and an air outlet (a floor outlet and a defrost outlet) formed for air discharge on the left thereof. FIG. 1 is a cross-sectional view exemplarily illustrating the right and left of the air conditioning case 102 having the air inlet and the air outlet, and illustrates the flow of air, which is introduced through the air inlet and discharged through the air outlet, indicated by the arrows 114 and 116 in the air conditioning case 102. The arrow 114 indicates an air flow through an upward discharge passage 114 in the air conditioning case 102 and the arrow 116 indicates an air flow through a downward discharge passage 116 in the air conditioning case 102. As illustrated in FIG. 1, the air that has flowed to a region A in the air conditioning case 102 through the air inlet thereof may flow to a region A' in the air conditioning case 102 to pass through the heating unit 118 by the upward discharge passage 114, and then be discharged to the interior of the vehicle through a defrost outlet 122. The air that has flowed to a region B through the air inlet of the air conditioning case 102 may flow to a region B' in the air conditioning case 102 to pass through the heating unit 118 by the downward discharge passage 116, and then be discharged to the interior of the vehicle through a floor outlet 124. In the instant case, the upward discharge passage 114 is an internal passage of the air conditioning case 102 in which air passes through the regions A and A' of the air conditioning case 102 and the heating unit 118 and then flows to the defrost outlet 122, and the downward discharge passage 116 is an internal passage of the air conditioning case 102 in which air passes through the regions B and B' of the air conditioning case 102 and the heating unit 118 and then flows to the floor outlet 124.

The air discharged to the vehicle interior through the upward discharge passage 114 is not mixed with the air discharged to the vehicle interior through the downward discharge passage 116. That is, the upward discharge passage 114 and the downward discharge passage 116 allow an independent air flow (airflow). To the present end, the upward discharge passage 114 and the downward discharge passage 116 are separated from each other in the air conditioning case 102. The air inlet of the air conditioning case 102 includes an outside air inlet 104, a first inside air inlet 106, and a second inside air inlet 108. The air introduced into the air conditioning case 102 through the outside air inlet 104 and the first inside air inlet 106 is discharged to the vehicle interior through the upward discharge passage 114. The air introduced into the air conditioning case 102 through the outside air inlet 104 and the second inside air inlet 108 is discharged to the vehicle interior through the downward discharge passage 116. The air that has passed through the upward discharge passage 114 is discharged toward the front glass in the vehicle interior, and the air that has passed through the downward discharge passage 116 is discharged toward the vehicle body floor in the vehicle interior.

Here, in the air conditioning case 102, outside air may be supplied to the upward discharge passage 114 and the downward discharge passage 116 through one outside air inlet 104. To prevent the air introduced into the upward discharge passage 114 from mixing with the air introduced into the downward discharge passage 116, a second intake door 112 may be mounted between the upward discharge passage 114 and the downward discharge passage 116. The second intake door 112 may completely block the air flow between the upward discharge passage 114 and the downward discharge passage 116 when the second inside air inlet 108 is fully (100%) open. The second intake door 112 may block the introduction of outside air into the downward discharge passage 116 when the second inside air inlet 108 is fully (100%) closed. The second intake door 112 may control the flow of outside air introduced into the air conditioning case 102 through the outside air inlet 104.

The second intake door 112 is mounted in the air conditioning case 102 to open or close the second inside air inlet 108. The second intake door 112 closes a leading end portion corresponding to the inlet of the downward discharge passage 116 when the second inside air inlet 108 is open, and opens the leading end portion of the downward discharge passage 116 when the second inside air inlet 108 is closed. That is, the upward discharge passage 114 and the downward discharge passage 116 may be separated by the second intake door 112 together with the internal partition structure provided in the air conditioning case 102. The outside air introduced through the outside air inlet 104 may be selectively introduced into the downward discharge passage 116 by the second intake door 112.

The outside air inlet 104 and the first inside air inlet 106 may be open or closed by a first intake door 110. The first intake door 110 is mounted in the air conditioning case 102 to open or close the outside air inlet 104 and the first inside air inlet 106. The first intake door 110 fully closes the first inside air inlet 106 when it fully opens the outside air inlet 104, and fully opens the first inside air inlet 106 when it fully closes the outside air inlet 104. The first intake door 110 partially opens the first inside air inlet 106 when it partially opens (i.e., partially closes) the outside air inlet 104. Accordingly, the opening amount (opening ratio) of the outside air inlet 104 and the first inside air inlet 106 may be controlled according to the switching operation of the first intake door 110.

Outside air and inside air may be simultaneously introduced into the downward discharge passage 116 when the second intake door 112 is at least partially open in the state in which the first intake door 110 is at least partially open (by a certain amount).

The present invention controls an amount of inside air based on the heating load of the air conditioner 100 and the internal humidity of the vehicle to circulate a maximum amount of inside air in the interior of the vehicle without fogging on the front glass when the vehicle interior is heated by the air conditioner 100 having the above configuration.

Here, the ratio of the inside air contained in the air discharged to the interior of the vehicle through the air conditioner 100 will be referred to as an "inside air mixing ratio".

Figure 2:
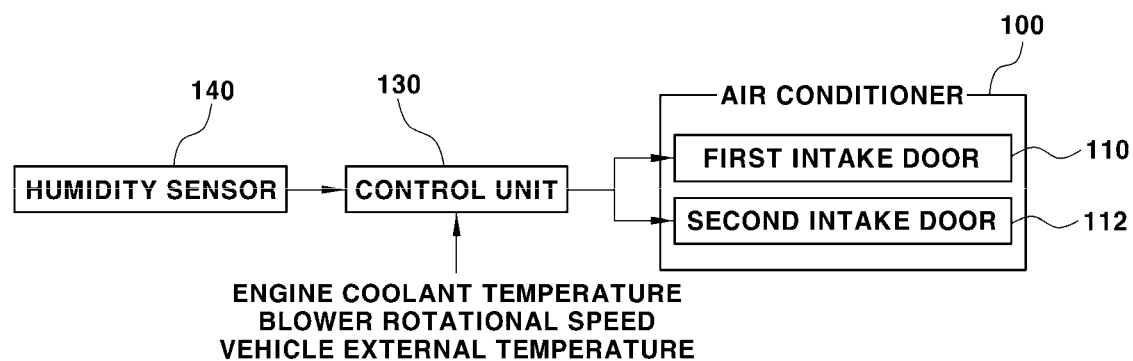
FIG. 2 is a block diagram illustrating a system for controlling inside/outside air in an air conditioner according to an exemplary embodiment of the present invention.
Figure 3A:
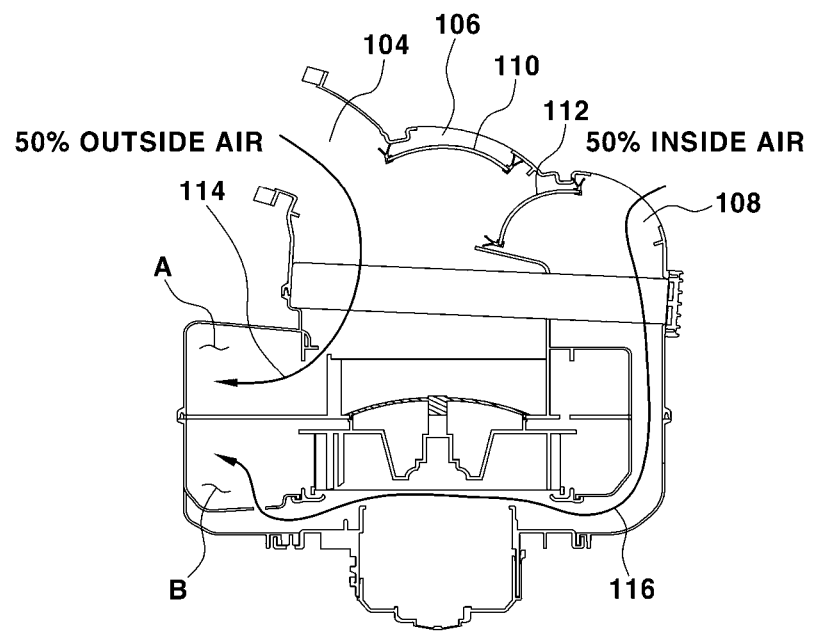
FIG. 3A, FIG. 3B, FIG. 3C, FIG. 3D, FIG. 3E and FIG. 3F are schematic views illustrating flows of outside air and inside air according to the operation of first and second intake doors.
Figure 4:
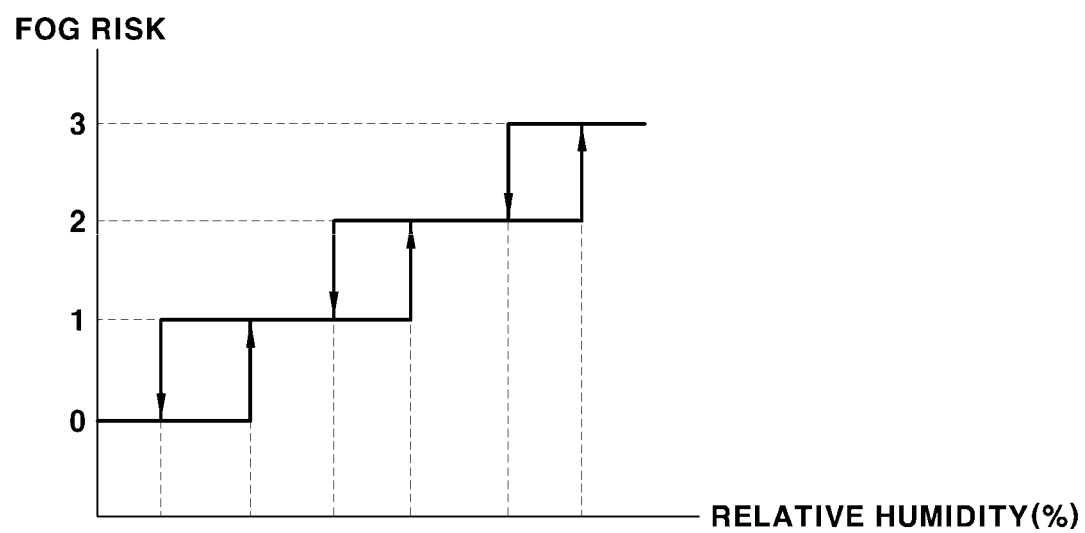
FIG. 4 is a graph illustrating a fog risk determined according to the relative humidity inside a vehicle.
Figure 5:
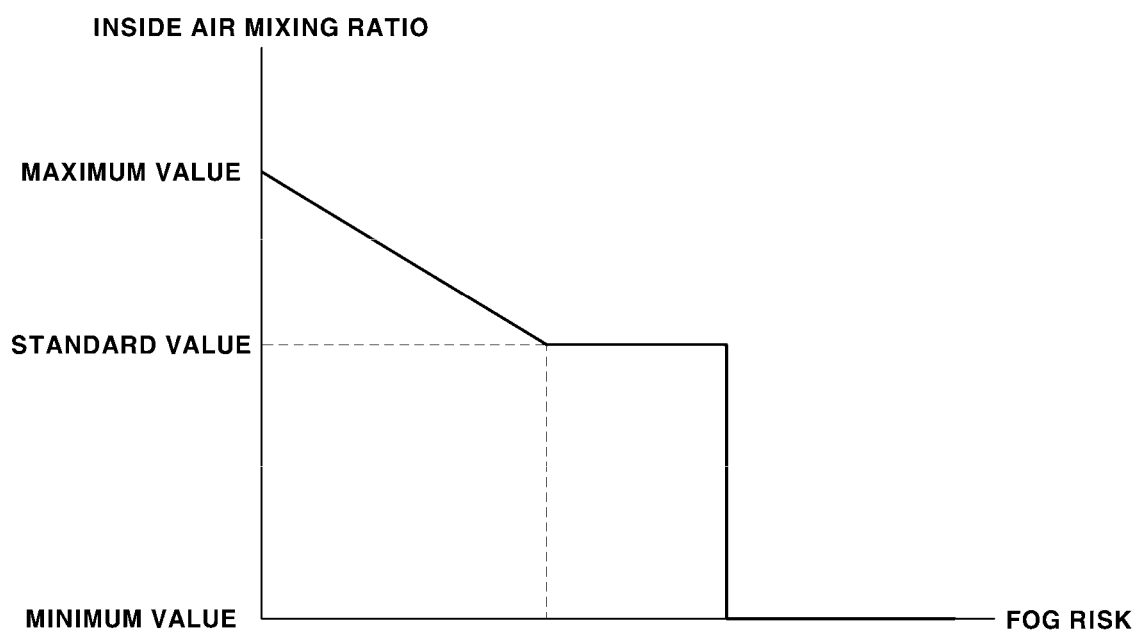
FIG. 5 is a graph illustrating an inside air mixing ratio according to the fog risk.
Figure 6:
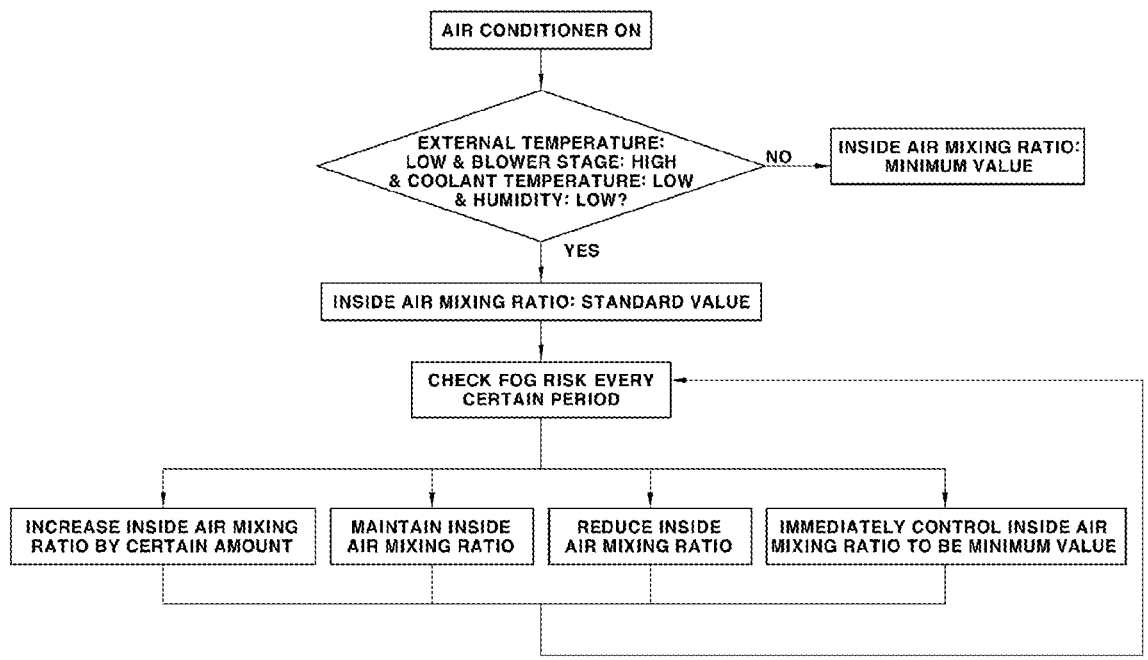
FIG. 6 is a flowchart illustrating a method of controlling inside/outside air in an air conditioner according to an exemplary embodiment of the present invention.

FIG. 2 is a block diagram illustrating a system for controlling inside/outside air in an air conditioner according to an exemplary embodiment of the present invention. FIG. 3A, FIG. 3B, FIG. 3C, FIG. 3D, FIG. 3E and FIG. 3F are schematic views illustrating the flows of outside air and inside air according to the operation of first and second intake doors. FIG. 4 is a graph illustrating a fog risk determined according to the relative humidity inside the vehicle. FIG. 5 is a graph illustrating an inside air mixing ratio according to the fog risk. FIG. 6 is a flowchart illustrating a method of controlling inside/outside air in an air conditioner according to an exemplary embodiment of the present invention.

As illustrated in FIG. 2, the system for controlling inside/outside air may include a first intake door 110, the opening amount (opening ratio) of which is determined according to the ratio between inside air and outside air introduced into an upward discharge passage 114 of an air conditioner case 102, a second intake door 112, the opening amount (opening ratio) of which is determined according to the ratio between inside air and outside air introduced into a downward discharge passage 116 of the air conditioner case 102, and a control unit 130 that controls the opening amounts of the first and second intake doors 110 and 112.

Only outside air is introduced into the upward discharge passage 114 when the first intake door 110 is fully (100%) open, whereas only inside air is introduced into the upward discharge passage 114 when the first intake door 110 is fully (100%) closed. Only inside air is introduced into the downward discharge passage 116 when the second intake door 112 is fully open, whereas only outside air is introduced into the downward discharge passage 116 when the second intake door 112 is fully closed. When the second intake door 112 is partially open, the ratio between outside air and inside air introduced into the downward discharge passage 116 is determined according to the opening amount of the second intake door 112. In the instant case, the outside air is introduced through an outside air inlet 104, and the inside air is introduced through a first inside air inlet 106.

The control unit 130 controls the opening amounts of the first and second intake doors 110 and 112 according to the heating load required for a heating unit 118 of an air conditioner 100 and the internal humidity of the vehicle. The control unit 130 may be an air conditioner control unit configured of controlling the overall operation of the air conditioner 100. The vehicle interior humidity may be a relative humidity value measured by a humidity sensor 140 mounted on the front glass in front of the vehicle.

When the heating load of the air conditioner 100 is equal to or greater than a set reference load and the vehicle interior humidity is less than or equal to a set reference humidity, the control unit 130 allows the first and second intake doors 110 and 112 to be fully (100%) open, and then periodically determines a fog risk (risk level) of the front glass to control the opening amount of the first intake door 110 according to the fog risk level. When the first and second intake doors 110 and 112 are fully open, only outside air flows into the upward discharge passage 114 whereas only inside sir flows into the downward discharge passage 116 (see FIG. 3A).

The fog risk level may be divided into a plurality of levels based on the relative humidity value of the vehicle interior (see FIG. 4). For example, the fog risk level may be divided into a 0th level (low risk), a first level (normal risk), a second level (high risk), a third level (very high risk), and the like. An inside air mixing ratio may be determined according to the fog risk level (see FIG. 5). The first level may be a reference level of the fog risk level.

The control unit 130 controls the opening amounts of the first and second intake doors 110 and 112 based on the fog risk level. As the opening amounts of the first and second intake doors 110 and 112 are controlled, the inside air mixing ratio may be changed.

The control unit 130 may gradually reduce the opening amount of the first intake door 110 (in a fully open state) when the fog risk level is lower than the reference level in the state in which the first and second intake doors 110 and 112 are fully open. That is, when it determined that the opening amount of the first intake door 110 may be reduced based on the fog risk level, the control unit 130 may reduce the opening amount of the first intake door 110. As the opening amount of the first intake door 110 is reduced, the inside air mixing ratio gradually increases from a standard value (see FIG. 5).

Figure 3B:
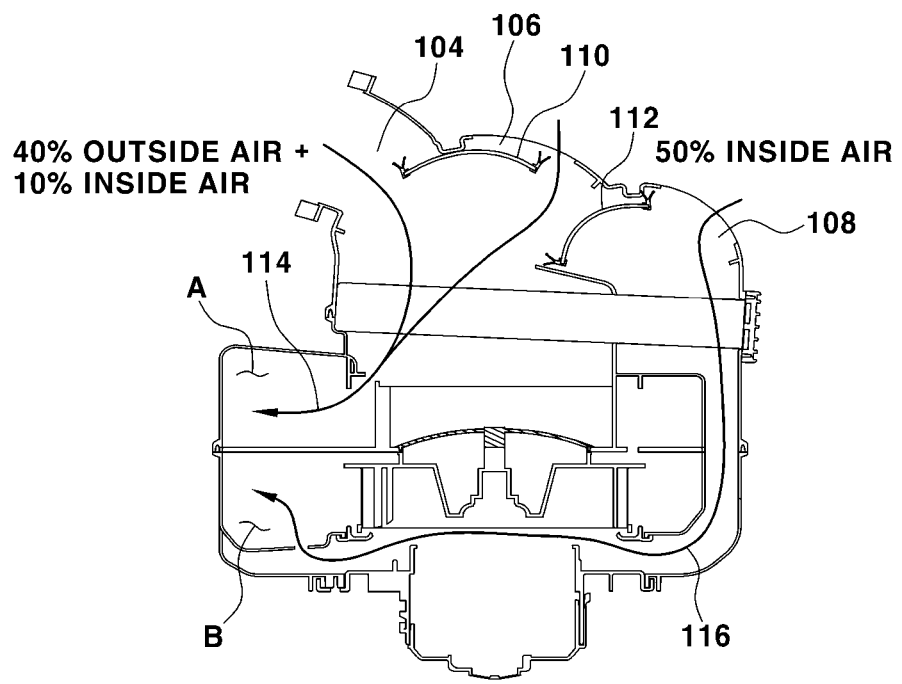
Figure 3C:
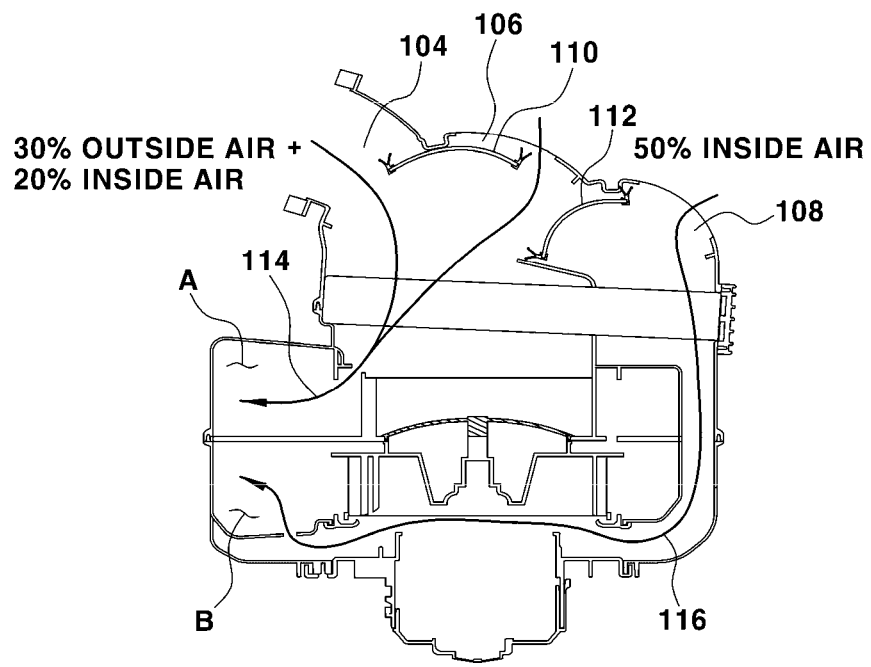

When the fog risk level is lowered by one step than the reference level, it is possible to reduce the opening amount of the first intake door 110 by a predetermined amount (e.g., 20%) to reduce the amount of outside air introduced through the outside air inlet 104 and introduce inside air through the first inside air inlet 106 (see FIG. 3B). Furthermore, when the fog risk level is further lowered by one step, namely when the fog risk level is lowered by two steps, it is possible to further reduce the opening amount of the first intake door 110 by the predetermined amount, namely by total 40% (set amount×2). Accordingly, the amount of outside air introduced through the outside air inlet 104 is further reduced, and the amount of inside air introduced through the first inside air inlet 106 is further increased (see FIG. 3C). When the fog risk level is further lowered by one step, it is possible to further reduce the opening amount of the first intake door 110 by the predetermined amount, namely by total 60% (set amount×3). In the instant case, a larger amount of inside air than the amount of outside air introduced through the outside air inlet 104 may be introduced through the first inside air inlet 106 (see FIG. 3D). In the instant case, the second intake door 112 is continuously maintained in a fully open state. Thus, the amount of outside air introduced into the vehicle interior through the air conditioner 100 is reduced, whereas the amount of inside air circulated in the vehicle interior through the air conditioner 100 is increased.

As a result, it is possible to enhance the heating performance of the vehicle interior without fogging. The opening amount of the first intake door 110 may be gradually reduced based on the predetermined amount or may be reduced more than twice the predetermined amount at a time according to the variation of the fog risk level.

When it is determined that it is necessary to reduce the opening amount of the second intake door 112 based on the fog risk level in the state in which the first intake door 110 is fully open, the control unit 130 may partially reduce the opening amount of the second intake door 112. When it is determined that the fog risk level is higher than the reference level in the state in which the first intake door 110 is fully open, the control unit 130 may determine that it is necessary to reduce the opening amount of the second intake door 112.

When the fog risk level is lowered by one step when the inside air mixing ratio is a minimum value, the control unit 130 may allow the second intake door 112 to be fully open to increase the inside air mixing ratio to a standard value. When the fog risk level is increased by one step when the inside air mixing ratio is the standard value, the control unit 130 may allow the second intake door 112 to be fully closed to reduce the inside air mixing ratio to the minimum value.

Figure 3D:
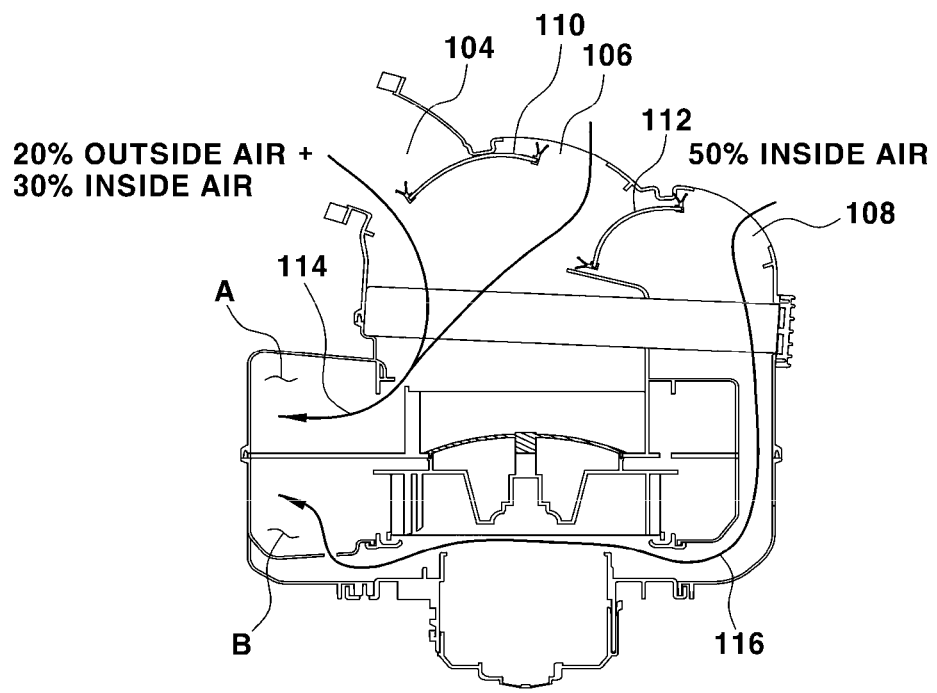

When the fog risk level is a set minimum level, the control unit 130 enables the first intake door 110 to be open by a predetermined amount and enables the second intake door 112 to be fully open to adjust the inside air mixing ratio to a maximum value (see FIG. 3D).

Figure 3E:
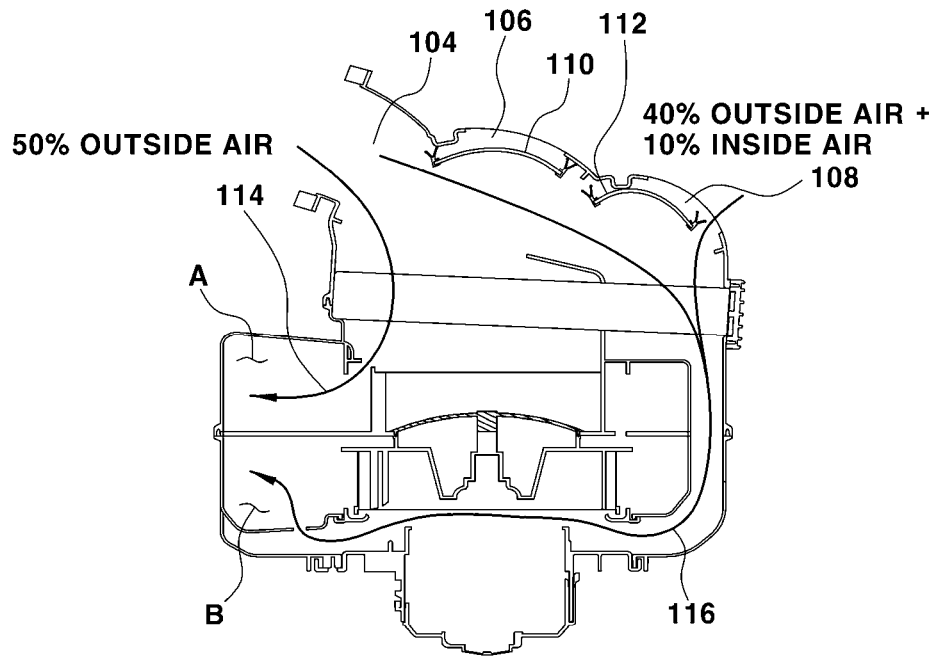
Figure 3F:
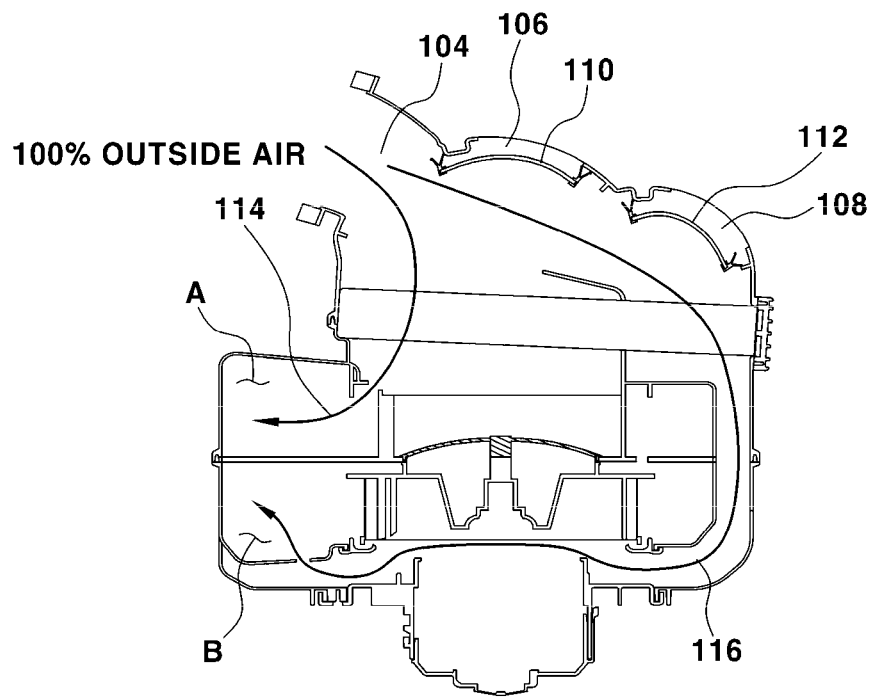

When the fog risk level is a set maximum level, the control unit 130 controls the first intake door 110 to be fully open and controls the second intake door 112 to be fully closed (see FIG. 3F).

Furthermore, when the fog risk level is maintained without variation, the control unit 130 may maintain the opening amount of the first intake door 110 as it is. That is, when it is determined that it is unnecessary to change the opening amount of the first intake door 110 based on the fog risk level, the control unit 130 may maintain the opening amount of the first intake door 110.

Meanwhile, when the heating load of the air conditioner 100 is less than the reference load, the control unit 130 enables the first intake door 110 to be fully open and enables the second intake door 112 to be fully (100%) closed. When the first intake door 110 is fully open and the second intake door 112 is fully closed, the introduction of inside air into the air conditioning case 102 is blocked and only outside air is introduced thereinto (see FIG. 3F). Thus, only outside air is discharged to the vehicle interior by the air conditioner 100. A blower is mounted in the air conditioning case 102. The blower may draw air through the air inlet of the air conditioning case 102 and discharge the air to the vehicle interior.

Here, the heating load of the air conditioner 100 may be determined according to the external temperature of the vehicle, the operation load of the blower, and the engine coolant temperature. The external temperature may be detected by an external temperature sensor mounted in the vehicle, and the blower operation load may be determined according to the rotation speed of the blower for controlling the flow rate of air discharged from the air conditioner to the vehicle interior. The rotation speed of the blower may be increased or decreased according to a user's demand or automatically set. The engine coolant temperature may be detected by a coolant temperature sensor mounted in the vehicle.

The heating unit 118 of the air conditioner 100 may heat the air passing through the upward and downward discharge passages 114 and 116, and may heat the air before the air is discharged to the vehicle interior. The heating unit 118 heats the air according to the heating load.

When the flows of inside air and outside air introduced into the air conditioning case 102 are controlled as described above, it is possible to circulate a larger amount of inside air in the vehicle interior and suppress fogging on the front glass, compared to when the air in the air conditioning case 102 flows into the state in which the upward discharge passage 114 and the downward discharge passage 116 are not separated from each other.

Hereinafter, a process of controlling the inside air mixing ratio using the system for controlling inside/outside air in an air conditioner having the above configuration will be described with reference to FIG. 6.

As illustrated in FIG. 6, the opening amounts of the first and second intake doors 110 and 112 are determined based on the heating load of the air conditioner 100 and the relative humidity of the vehicle interior in the state in which the air conditioner 100 is turned on. The heating load of the air conditioner 100 is determined based on the vehicle external temperature, the blower operation stage (i.e., blower rotation speed), and the engine coolant temperature. When the vehicle external temperature is less than or equal to a set reference external temperature, the blower operation stage is equal to or greater than a set reference stage, and the engine coolant temperature is less than or equal to a set reference coolant temperature, it may be determined that the heating load of the air conditioner 100 is equal to or greater than a set reference load.

When the heating load of the air conditioner 100 is equal to or greater than the set reference load and the relative humidity of the vehicle interior is less than or equal to a set reference humidity, the inside air mixing ratio is controlled to be a standard value (e.g., 50%) by fully opening the first and second intake doors 110 and 112 (see FIG. 3A). When the inside air mixing ratio is the standard value, only outside air flows into the upward discharge passage 114, only inside air flows into the downward discharge passage 116, and the ratio between outside air and inside air in the air discharged from the air conditioner 100 to the vehicle interior is 1:1. Next, the fog risk level is checked according to the relative humidity of the vehicle interior every certain period (e.g., 15 seconds), and the opening amounts of the first and second intake doors 110 and 112 are controlled according to the fog risk level.

As a result of checking the fog risk level, when it is determined that the fog risk level is normal, the opening amount of the first intake door 110 and the inside air mixing ratio are maintained, and when it is determined that the fog risk level is low, the opening amount of the second intake door 112 is maintained and the opening amount of the first intake door 110 is reduced by a certain ratio (e.g., 20%). When the opening amount of the first intake door 110 is reduced, the inside air mixing ratio is increased by a certain ratio. However, when the inside air mixing ratio reaches a maximum value (e.g., 80%), the inside air mixing ratio is not increased any more.

As a result of checking the fog risk level, when it is determined that the fog risk level is high, the opening amount of the first intake door 110 is maintained and the opening amount of the second intake door 112 is reduced (see FIG. 3E).

As a result of checking the fog risk level, when it is determined that the fog risk level is very high, the opening amount of the first intake door 110 is maintained in a fully open state and the opening amount of the second intake door 112 is changed to a fully closed state. In the instant case, the inside air mixing ratio is controlled to be a minimum value (e.g., 0%).

Furthermore, when one of the condition that the heating load of the air conditioner 100 is equal to or greater than the reference load and the condition that the relative humidity of the vehicle interior is less than or equal to the reference humidity is unsatisfied, the inside air mixing ratio is controlled to be the minimum value (e.g., 0%). To the present end, the first intake door 110 is fully closed so that the second inside air inlet 108 is fully closed (see FIG. 3F).

Here, the reference external temperature may be 0° C., the reference stage may be a fifth stage when the number of blower operation stages is a total of 8 stages, the reference coolant temperature may be 70° C., and the reference humidity may be 55%.

Meanwhile, in the case where the humidity sensor 140 is not mounted in the vehicle, it is difficult to detect the relative humidity value of the vehicle interior. Accordingly, various aspects of the present invention are directed to providing system for controlling inside/outside air in an air conditioner, configured for controlling the amount of inside air circulated in the interior of the vehicle in consideration of only the heating load of the air conditioner 100 without considering the humidity value of the vehicle interior.

Figure 7:
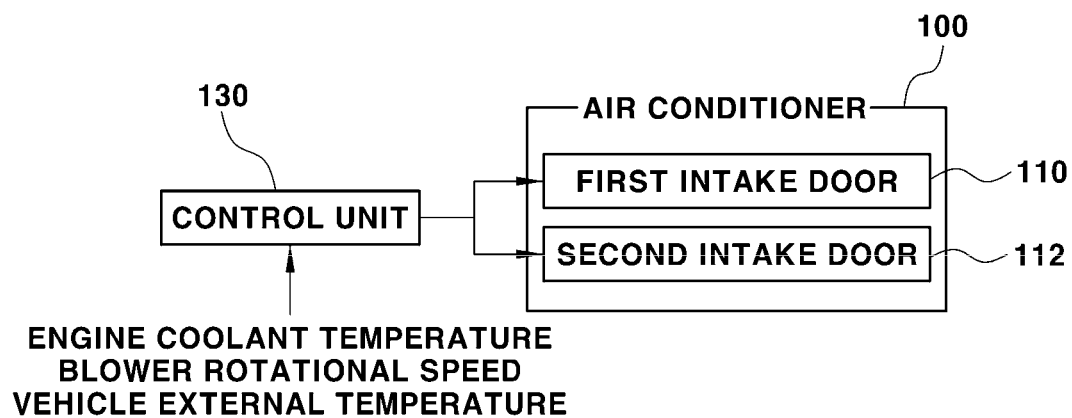
FIG. 7 is a block diagram illustrating a system for controlling inside/outside air in an air conditioner according to various exemplary embodiments of the present invention.

FIG. 7 is a block diagram illustrating a system for controlling inside/outside air in an air conditioner according to various exemplary embodiments of the present invention.

Figure 8A:
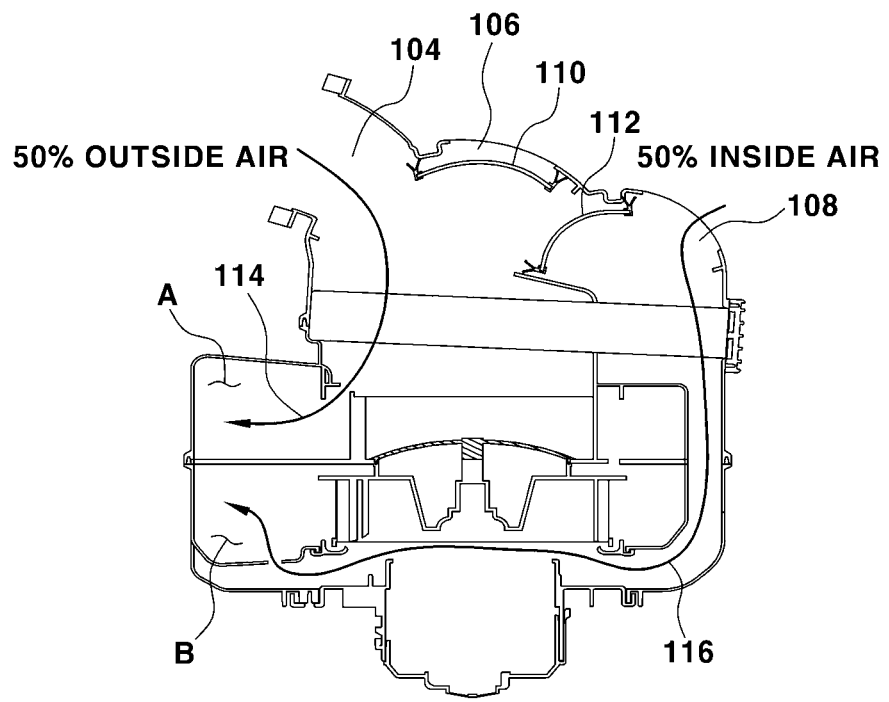
FIG. 8A, FIG. 8B, and FIG. 8C are schematic views illustrating flows of outside air and inside air according to the operation of first and second intake doors.
Figure 8B:
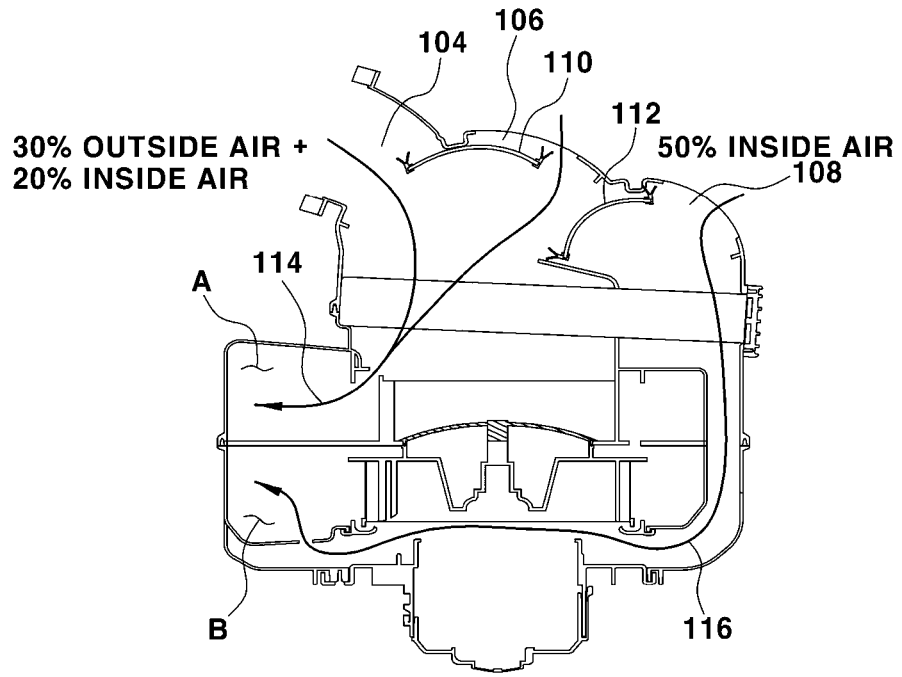
Figure 8C:
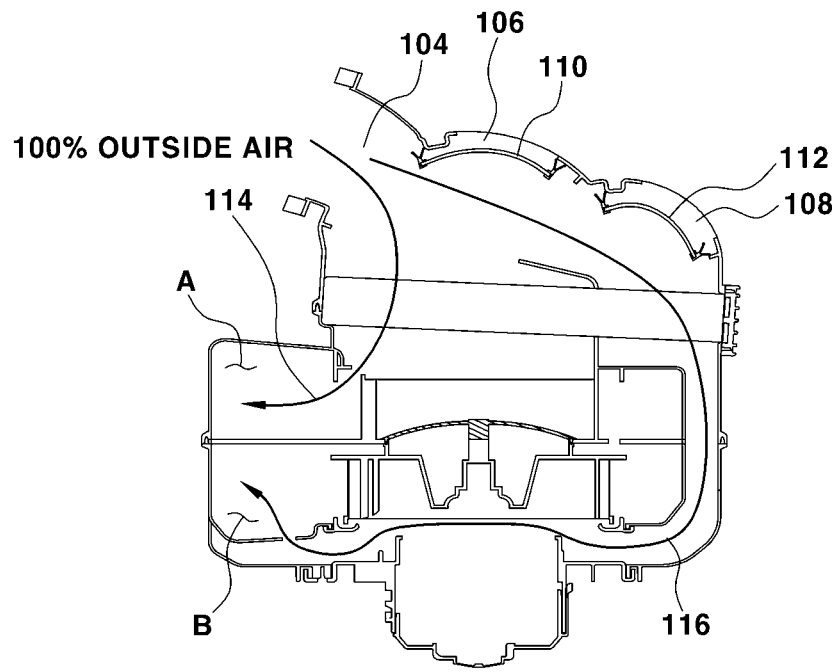

FIG. 8A, FIG. 8B, and FIG. 8C are schematic views illustrating flows of outside air and inside air according to the operation of first and second intake doors. FIG. 9 is a block diagram illustrating a method of controlling inside/outside air in an air conditioner according to various exemplary embodiments of the present invention.

In the following description of another exemplary embodiment of the present invention, a description duplicated with that described above may be omitted.

As illustrated in FIG. 7, the system for controlling inside/outside air in an air conditioner according to various exemplary embodiments of the present invention may include a first intake door 110, the opening amount (opening ratio) of which is determined according to the ratio between inside air and outside air flowing through an upward discharge passage 114 of an air conditioner case 102, a second intake door 112, the opening amount (opening ratio) of which is determined according to the ratio between inside air and outside air flowing through a downward discharge passage 116 of the air conditioning case 102, and a control unit 130 that controls the opening amounts of the first and second intake doors 110 and 112.

The control unit 130 controls the opening amounts of the first and second intake doors 110 and 112 according to the heating load of an air conditioner 100. When the heating load of the air conditioner 100 is equal to or greater than a set first load value and less than a set second load value (first load value <second load value), the control unit 130 controls the first and second intake doors 110 and 112 to be fully open (see FIG. 8A). In the instant case, only outside air may be introduced into the upward discharge passage 114 whereas only inside sir may be introduced into the downward discharge passage 116. In the instant case, the inside air mixing ratio is a standard value (e.g., 50%). For example, the ratio between inside air and outside air discharged to the vehicle interior through the air conditioner 100 may be 1:1.

When the heating load of the air conditioner 100 is equal to or greater than the second load value, the control unit 130 controls the first intake door 110 to be partially open (by a certain amount) by adjusting the opening amount of the first intake door 110 according to the ratio between inside air and outside air, and controls the second intake door 112 to be fully open (see FIG. 8B). In the instant case, outside air and inside air may be simultaneously introduced into the upward discharge passage 114 whereas only inside sir may be introduced into the downward discharge passage 116. In the instant case, the inside air mixing ratio is a maximum value (e.g., 70%). For example, the ratio between inside air and outside air discharged to the vehicle interior through the air conditioner 100 may be 7:3.

When the heating load of the air conditioner 100 is less than the first load value, the control unit 130 controls the first intake door 110 to be fully open and controls the second intake door 112 to be fully closed (see FIG. 8C). In the instant case, only outside air may be introduced into the upward discharge passage 114 and the downward discharge passage 116. In the instant case, the inside air mixing ratio is a minimum value (e.g., 0%). For example, the air discharged to the vehicle interior through the air conditioner 100 may be outside air as a whole.

As described above, the control unit 130 can secure the heating performance of the vehicle interior by circulating inside air when it is determined that the heating load of the air conditioner 100 is high, whereas it can control the inside air mixing ratio to be the minimum value to suppress fogging on the front glass when it is determined that the heating load is low.

In the system for controlling inside/outside air in an air conditioner according to various exemplary embodiments of the present invention having the above configuration, it is possible to prevent fogging on the front glass and circulate a large amount of inside air such that the inside air is circulated only when the heating load is equal to or greater than the first load value and the inside air is not circulated when heating load is less than the first load value.

Here, the second load value is set to be a load value which is higher by a certain value than the first load value. For example, the vehicle external temperature condition of the first load value may be −10° C. to 0° C. and the vehicle external temperature condition of the second load value may be −10° C. or less.

Hereinafter, a process of controlling the inside air mixing ratio using the system for controlling inside/outside air in an air conditioner having the above configuration will be described with reference to FIG. 9.

As illustrated in FIG. 9, the heating load of the air conditioner 100 is determined based on the vehicle external temperature, the blower operation stage, and the engine coolant temperature in the state in which the air conditioner 100 is turned on. When the vehicle external temperature is less than a set critical external temperature (e.g., −10° C.), the blower operation stage is equal to or greater than a set reference stage, and the engine coolant temperature is less than or equal to a set reference coolant temperature, it is determined that the heating load of the air conditioner 100 is equal to or greater than a set second load value. When the heating load is equal to or greater than the second load value, the opening amounts of the first and second intake doors 110 and 112 are controlled to adjust the inside air mixing ratio to a maximum value. In the instant case, the second intake door 112 is controlled to be fully open.

When the vehicle external temperature is equal to or greater than the critical external temperature and less than a set reference external temperature (e.g., 0° C.), the blower operation stage is equal to or greater than the set reference stage, and the engine coolant temperature is less than or equal to the set reference coolant temperature, it is determined that the heating load of the air conditioner 100 is equal to or greater than a set first load value and less than the second load value. When the heating load is equal to or greater than the first load value and less than the second load value, the first and second intake doors 110 and 112 are controlled to be fully open. In the instant case, the inside air mixing ratio is a standard value (e.g., 50%).

When the heating load is less than the first load value, the first intake door 110 is controlled to be fully open and the second intake door 112 is controlled to be fully closed. In the instant case, the inside air mixing ratio is a minimum value (e.g., 0%).

In accordance with the system for controlling inside/outside air in an air conditioner of the present invention, it is possible to improve the heating performance of the vehicle interior by reducing the introduction amount of outside air to the extent that no fog is generated on the front glass in front of the vehicle to reduce the heat loss of the vehicle interior due to outside air and circulating the maximum amount of inside air. Therefore, it is not necessary to increase the engine coolant temperature for securing indoor heating performance and it is possible to improve heating performance without decreasing the engine efficiency.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling inside/outside air in an air conditioner, the system comprising:
   the air conditioner including:
   an upper discharge passage, through which air is discharged toward a front glass of a vehicle;
   a lower discharge passage, through which air is discharged toward a floor of the vehicle, the upper discharge passage and the lower discharge passage being separated from each other;
   a first intake door, an opening amount of which is determined according to a ratio between inside air and outside air introduced into the upper discharge passage; and
   a second intake door, an opening amount of which is determined according to a ratio between inside air and outside air introduced into the lower discharge passage; and
   a control unit configured of controlling the opening amounts of the first and second intake doors according to a heating load of the air conditioner and a humidity of an interior of the vehicle.

2. The system of claim 1,
   wherein the upper discharge passage is configured such that only outside air is introduced when the first intake door is fully open and only inside air is introduced when the first intake door is fully closed, and the lower discharge passage is configured such that only inside air is introduced when the second intake door is fully open and only outside air is introduced when the second intake door is fully closed.

3. The system of claim 2, wherein outside air and inside air are introduced into the upper discharge passage when the first intake door is partially open, and outside air and inside air are introduced into the lower discharge passage when the second intake door is partially open in a state in which the first intake door is at least partially open.

4. The system of claim 3, wherein, when the heating load of the air conditioner is equal to or greater than a reference load and the humidity at the interior of the vehicle is less than or equal to a reference humidity, the control unit is configured to allow the first and second intake doors to be fully open, and then periodically controls the opening amounts of the first and second intake doors based on a fog risk level according to the humidity at the interior of the vehicle.

5. The system of claim 4, wherein the fog risk level includes a plurality of levels based on an internal humidity value, and the control unit is configured to reduce the opening amount of the first intake door and maintains the opening amount of the second intake door upon determining that it is possible to reduce the opening amount of the first intake door based on the fog risk level.

6. The system of claim 5, wherein the control unit is configured to determine that it is possible to reduce the opening amount of the first intake door upon determining that the fog risk level is lower than a set reference level.

7. The system of claim 5, wherein the control unit is configured to allow the first intake door to be open by a predetermined amount and allows the second intake door to be maintained in a fully open state when the fog risk level is a predetermined minimum level, and allows the first intake door to be maintained in a fully open state and allows the second intake door to be fully closed when the fog risk level is a predetermined maximum level.

8. The system of claim 4, wherein the control unit is configured to reduce the opening amount of the second intake door and maintains the opening amount of the first intake door upon determining that it is necessary to reduce the opening amount of the second intake door based on the fog risk level in a state in which the first intake door is fully open.

9. The system of claim 8, wherein the control unit is configured to determine that it is necessary to reduce the opening amount of the second intake door upon determining that the fog risk level is higher than a set reference level in a state in which the first intake door is fully open.

10. The system of claim 4, wherein the control unit is configured to maintain the opening amount of the first intake door upon determining that it is unnecessary to change the opening amount of the first intake door based on the fog risk level, and maintains the opening amount of the second intake door upon determining that it is unnecessary to change the opening amount of the second intake door based on the fog risk level.

11. The system of claim 4, wherein the control unit is configured to allow the first intake door to be fully open and allows the second intake door to be fully closed when the heating load of the air conditioner is less than the reference load or the humidity at the interior of the vehicle exceeds the reference humidity.

12. The system of claim 1, wherein the heating load of the air conditioner is determined based on a vehicle external temperature, a blower rotation speed of the air conditioner, and an engine coolant temperature.

13. The system of claim 1, wherein the humidity at the interior of the vehicle is a relative humidity value measured by a humidity sensor mounted on the front glass in a front of the vehicle.

14. The system of claim 1, wherein the air conditioner includes a heating unit of heating air introduced into the upper discharge passage and the lower discharge passage, and the heating unit heats the air according to the heating load.

15. A system for controlling inside/outside air in an air conditioner, the system comprising:
the air conditioner including:
an upper discharge passage, through which air is discharged toward a front glass of a vehicle;
a lower discharge passage, through which air is discharged toward a floor of the vehicle, the upper discharge passage and the lower discharge passage being separated from each other;
a first intake door, an opening amount of which is determined according to a ratio between inside air and outside air introduced into the upper discharge passage; and
a second intake door, an opening amount of which is determined according to a ratio between inside air and outside air introduced into the lower discharge passage; and
a control unit configured of controlling the opening amounts of the first and second intake doors according to a heating load of the air conditioner.

16. The system of claim 15, wherein the upper discharge passage is configured such that only outside air is introduced when the first intake door is fully open and only inside air is introduced when the first intake door is fully closed, and the lower discharge passage is configured such that only inside air is introduced when the second intake door is fully open and only outside air is introduced when the second intake door is fully closed.

17. The system of claim 16, wherein outside air and inside air are introduced into the upper discharge passage when the first intake door is partially open, and outside air and inside air are introduced into the lower discharge passage when the second intake door is partially open in a state in which the first intake door is at least partially open.

18. The system of claim 17, wherein the control unit is configured to allow the first and second intake doors to be fully open when the heating load of the air conditioner is equal to or greater than a first load value and less than a second load value.

19. The system of claim 17, wherein the control unit is configured to allow the first intake door to be open by a predetermined amount and allows the second intake door to be fully open when the heating load of the air conditioner is equal to or greater than the second load value which is higher than the first load value.

20. The system of claim 17, wherein the control unit is configured to allow the first intake door to be fully open and allows the second intake door to be fully closed when the heating load of the air conditioner is less than a first load value.

* * * * *